2,711,370

MANUFACTURE OF SIZED, FILLED PAPER

David Lurie, Freeport, N. Y., assignor to American Cyanamid Company, New York, N. Y., a corporation of Maine No Drawing. Application April 12, 1954,
Serial No. 422,655

4 Claims. (Cl. 92—21)

The present invention relates to the manufacture of sized, filled paper and sized, filled wet strength paper by the beater addition process. The invention includes a method for utilizing the dissolved sulfate ion content of paper mill white water systems while producing rosin sized papers including rosin sized wet strength papers containing barium sulfate, aluminum hydrate and, if desired, aluminum phosphate as fillers. The invention further includes a method for maintaining the dissolved sulfate ion content substantially constant in closed or substantially closed paper mill water systems, that is, systems in which more than about 60%–80% of the white water is recycled.

Ordinary sized paper is generally manufactured by forming a dilute aqueous suspension of paper-making cellulosic fibers at between about ½% to 1% consistency, adding liquid rosin or other soap size thereto, precipitating the sizing material on the fibers by the addition of alum, and sheeting the fibers on a wire screen. The water employed to suspend the fibers drains through the screen, and the cellulosic web on the screen is heated and dried to form paper, paperboard, etc.

So far as is practical, the water draining through the screen is recycled to form a fresh suspension of cellulose fibers. It is found, however, that as the water is recycled it contains increasing amounts of aluminum and sulfate ions for the following reasons.

The theoretical equation for the reaction of rosin size (as sodium rosinate) with aluminum sulfate indicates that the aluminum sulfate is split, the aluminum ions being insolubilized by combination with the rosin as aluminum trirosinate while the sulfate ions remain in solution as sodium sulfate. Moreover, paper is practically always sized with at least ½% and usually 1%–3% of rosin size based on the weight of the fibers, and the weight of alum added is customarily 150% or more of the weight of the rosin, or from about ¾% to 4½%. Since the weight of alum required by stoichiometric calculation, assuming complete formation of aluminum trirosinate from the sodium rosinate, is only 33% of the weight of sodium rosinate, etc., it is evident that constituents of aluminum sulfate accumulate in the water to a very significant extent, as the water is recycled, along with a smaller proportion of sodium sulfate.

For example, the addition of 1.5% of alum to precipitate 1% of rosin size on the fibers in a suspension of 1% consistency causes the dissolved sulfate ion content of the water to rise up to 75 parts per million depending principally on the type of fibers employed and the pH of the stock, the dissolved sodium ion concentration increasing at the much slower rate of about 7.2 parts per million. The dissolved sulfate ion content of the water thus continuously rises as the water is reused, and since fresh river and well waters frequently contain substantial concentrations of sulfate ions, values of 50–250 parts per million being common, dissolved sulfate ion concentrations as high as 1600 parts per million have been observed in actual mill operations. Since sizing materials such as rosin size, alone or in conjunction with wax size, are best precipitated from water containing a minimum amount of dissolved sulfate ions and are not precipitated well from water containing more than about 500–800 parts per million of dissolved sulfate ions, it is evident either that the manufacture of sized paper generally is not now performed under optimum conditions, or that large amounts of water containing substantial aluminum and sulfate values are allowed to go to waste.

As the water is reused, ultimately the concentration of sulfate ions becomes so high that the paper-making equipment, particularly the wire, becomes subjected to corrosion and the water resistance of the paper obtained decreases. Moreover, where a wet strength resin is added, the sulfate ions inhibit adsorption of the resin by the cellulose fibers resulting in formation of paper of deficient wet strength (cf. Maxwell et al. U. S. Patent No. 2,599,-221). It is general practice, therefore, to continuously bleed off a portion of this water, replacing it with fresh in an effort to maintain the dissolved sulfate ion content of the water within desirably low limits. Discharge of this water, however, frequently gives rise to stream pollution problems, and in any event results in complete waste of the aluminum and sulfate ions dissolved therein.

Furthermore, the white water contains a proportion of undersize cellulose fibers, that is, fibers which are so small that they are not retained on the wire screen when the fibrous suspension is sheeted. These fibers are similarly lost when the white water is sent to waste.

In the past it has been proposed to control the sulfate ion concentration by the addition of barium chloride (cf. U. S. Patent No. 2,548,513). This, however, has not proved practical as barium chloride is costly and the barium sulfate is formed as crystals so small as to be substantially unfilterable. As a result, substantially all the barium chloride added flows out with the white water principally as barium sulfate and does not increase the value of the paper.

A recent development of the paper industry is the manufacture of rosin sized, wet strength paper. The process followed is that outlined above, except that a separately-prepared aqueous dispersion of a wet strength resin in cellulose-substantive form is added to the fibrous suspension at an appropriate point, usually just ahead of the headbox. Thereafter the suspension is sheeted in normal manner and is heated and dried to cure the resin on the fibers, thus developing the strengthening properties of the resin thereon.

It is known that a number of wet strength resins are inactivated or otherwise rendered less efficient by the presence of too high or too low a content of dissolved sulfate ions in the water during their adsorption, and these include the widely-used cationic melamine-formaldehyde resins (cf. Maxwell et al. U. S. Patent No. 2,559,221) and certain of the anionic urea-formaldehyde bisulfite resins. The dissolved sulfate ion concentration for best adsorption of these resins in most instances is within the range of about 10 to 150 parts per million, and particularly 30 parts per million. The optimum sulfate ion concentration varies from resin to resin, and is most conveniently determined by laboratory trials as shown in the Maxwell et al. patent.

No commercially practical method exists at the present time for exercising direct control over the dissolved sulfate ion content of papermaking fibrous suspensions within the limits mentioned. It is therefore general practice in closed systems to bleed off a portion of the white water from closed white water systems replacing it with fresh so as to maintain the dissolved sulfate ion content of the water within desirably low limits.

This, however, usually does not produce optimum results in open systems since paper mill make-up water is generally fresh river and well waters which frequently contain substantial amounts of dissolved sulfate ions, values of 50 to 250 parts per million being common. Moreover, discharge of this water frequently gives rise to stream pollution problems and in any event results in complete waste of the aluminum and sulfate ions dissolved therein, together with the undersize cellulosic fines which are not retained on the screen when the fibrous suspension is sheeted.

The discovery has now been made that the dissolved sulfate ion content in paper-making system water can be readily controlled within optimum limits with substantially complete deposition of these sulfate values on the cellulose fibers in the form of valuable filling material by incorporating three steps in the normal paper-making process. In the first step, after the fibers have been sized with rosin or similar material, sufficient barium chloride is added to decrease the sulfate ion concentration in the cellulose fiber suspension to a value most desirable under the particular circumstances. This causes a precipitate of barium sulfate to form.

In the second step, a small amount of sodium aluminate is added, preferably together with a small amount of a neutral or alkaline sodium phosphate, or more advantageously still, the two materials are added together as the sodium phosphate aluminate of my U. S. Patent No. 2,431,946.

In the third step, the suspension is aged until a floc of aluminum hydrate has formed which absorbs the barium sulfate particles with any aluminum phosphate particles precipitated and carries them to the fibers together with a large part of the cellulose fiber fines present.

From the foregoing, it will be apparent that the present invention may be described broadly as a method for manufacturing sized, filled paper or other cellulosic web by forming a dilute aqueous suspension of paper-making cellulosic fibers, sizing the fibers therein by addition of an alum-precipitable sizing agent and alum thereto, adding barium chloride in amount at least about stoichiometrically equivalent to said alum, whereby the dissolved sulfate ions derived from said alum are precipitated as barium sulfate particles, adding a small amount of a sodium aluminate and aging the suspension, whereby a floc of aluminum hydrate forms which adsorbs said barium sulfate particles and carries the same to the fibers, and sheeting and drying the fibers to form paper. As stated, most advantageously the sodium aluminate is added in the form of sodium phosphate aluminate, whereby a coprecipitate of aluminum hydrate and aluminum phophate forms, the sodium phosphate constituent of the sodium phosphate aluminate reacting with the dissolved aluminum sulfate and forming a precipitate of finer particle size which is more readily adsorbed by the fibers.

For the manufacture of wet strength, sized paper the process is performed as described, except that sufficient barium chloride is added to decrease the dissolved sulfate ion concentration to between about 30 and 150 parts per million, and an aqueous dispersion of a suitable wet strength resin in cellulose-substantive form is subsequently added after the action of the barium chloride and sodium aluminate is substantially complete.

Calculations show that in a paper mill employing fresh make-up water containing 50 parts per million of dissolved sulfate ions and recirculating its white water in a completely closed system, and manufacturing rosin sized paper by adding 2% of liquid rosin size and 3% of alum to a cellulose suspension at 1% consistency, the white water reaches the maximum practical value of 800 parts per million of dissolved sulfate ions after about five cycles of use. Calculations further show that when this procedure is modified according to the present invention by the introduction of barium chloride and sodium aluminate as described, the water can be reused at least 20 times before its dissolved sodium chloride and sulfate ion content interfere significantly with the rosin sizing process.

The foregoing process has the following principal advantages:

1. The paper thus obtained has improved weight, opacity, and texture, but is otherwise indistinguishable so far as the user is concerned from paper produced in heretofore known manner.
2. The weight of filler in the paper is about equal to the weight of barium chloride and sodium aluminate added.
3. The white water drained from the fibers during sheeting has a desirably low dissolved sulfate ion content and therefore acidity, and is suitable for much more extensive reuse in the paper-making cycle than would otherwise be the case.
4. The white water is substantially free from undersize cellulosic fibers, which fibers are adsorbed and deposited on the larger cellulosic fibers by the coagulating effect of the aluminum hydrate.
5. When the white water is finally sent to waste, its principal ionic content is sodium chloride. Ordinarily, disposal of sodium chloride solution does not create a stream pollution problem.
6. Typically, when operating according to the present invention so as to form paper containing 1%–3% by weight of rosin size, the paper produced contains about 2½%–6% by weight of filler. This amount of filler is sufficient to give the paper distinctly improved weight and opacity while conferring the other advantages listed above.

The present invention is capable of numerous distinct embodiments. Considering, for example, the manufacture of rosin sized paper, the alum and barium chloride may be added first, then the rosin size, and finally the sodium aluminate.

Alternatively, in this modification, the rosin size may be added first, before the alum. In the manufacture of rosin sized, wet strength paper the alum and barium chloride may be added first, then the rosin, then the sodium aluminate, alone or in conjunction with sodium phosphate, and finally the wet strength resin.

The common feature of these modifications when operating in batch procedure is that in the manufacture of sized paper, the sodium aluminate is added last, and in the manufacture of sized wet strength paper the sodium aluminate is added before the wet strength resin. In cyclic processes, where the amount of barium chloride added is sufficient to decrease the sulfate ion concentration to within the range tolerated well by the wet strength resin and the white water is recycled, the wet strength resin may be added first, this being equivalent to the foregoing embodiment where the wet strength resin is added last.

The process will be described step-wise in detail with regard to a typical preferred embodiment suitable for industrial use.

In the first step, a suspension of cellulose fibers is formed and is beaten or refined in the usual manner to render the fibers suitable for paper-making purposes. The water at this point may have any ordinary sulfate ion content, and in this illustration it will be assumed that the suspension is prepared by the use of fresh, natural water containing 60 parts per million of dissolved sulfate ions as is frequently the case.

In the second step, the suspension is diluted to a consistency of 0.6% by addition of more of the same water and the fibers are sized by addition of 1.5% of rosin size and 2.5% of papermaker's alum, both based on the dry weight of the fibers. The sulfate ion concentration in the suspension is then about 135 parts per million.

In the third step, there is added 227 lb. of solid or dissolved $BaCl_2$ per million pounds of water to decrease the dissolved sulfate ion concentration to the desirable value of 30 parts per million, this being a concentration at which most wet strength resins are efficiently adsorbed while ensuring that no barium chloride or other watersoluble barium salt will be present in the paper. A white precipitate of barium sulfate forms immediately.

In the fourth step, there is added about 0.4% based on the dry weight of the fibers of sodium phosphate aluminate, and the suspension aged about 3–10 minutes by gentle pumping through a large storage tank until formation of alumina hydrate floc is substantially complete and has carried the barium sulfate particles to the fibers.

In the fifth step, an aqueous dispersion of a cellulose-substantive wet strength resin is added such as the amine-aldehyde resins shown, for example, in U. S. Patents No. 2,345,543, 2,407,376, 2,485,080, 2,559,221, 2,582,840, 2,596,014, and 2,639,242, and after adsorption of the resin by the fibers the fibers are formed into paper.

The sizing agents and wet strength resins employed together with the methods by which these materials are deposited on the fibers and the fibers are formed into paper or other cellulosic web are not particular features of the present invention.

The barium chloride may be added in anhydrous or hydrated form and may be pre-dissolved, if desired, to facilitate metering. According to the invention, the amount added is sufficient to decrease the sulfate ion content of the suspension to a desirable value. When fresh water of low sulfate ion content is available, about three mols of barium chloride is added per mol of alum taken, this stoichiometric amount maintaining the sulfate ion concentration substantially constant. Where the water contains a large amount of dissolved sulfates, a larger initial addition of barium chloride is advantageously made to reduce the sulfate ion concentration to the desirable value, after which only sufficient barium chloride need be added to precipitate the sulfate ions derived from the alum.

The sodium aluminate may be added in pure form, but more advantageously will be added in admixture with a neutral or alkaline alkali metal such as di or trisodium phosphate, or in the form of sodium aluminate phosphate. Only from about ¼% to ½% by weight of the sodium aluminate need be added based on the dry weight of the fibers, this amount ensuring formation of sufficient floc to adsorb the barium sulfate particles and cellulose fines and carry them to the fibers, while avoiding the danger of adding too little.

The amount of sodium phosphate (anhydrous basis) added is advantageously between about 25% of the weight of the sodium aluminate, this amount providing a large number of fine aluminum phosphate particles which act in the manner of nuclei promoting precipitation of the aluminum hydrate as a finely-divided floc.

In the present specification, it will be understood that the phrase "sized paper" is used to designate paper composed of cellulosic fibers having deposited thereon an effective amount of an alum-precipitable size, and that the weight of this size on the fibers is at least 1% of the weight of the fibers.

The invention will be more particularly illustrated by the following examples. These examples are embodiments of the invention and are not to be construed in limitation thereon.

*Example 1*

The following illustrates the manufacture of rosin-sized paper containing about 3% by weight of filler resulting from the addition of barium chloride and sodium phosphate aluminate to an aqueous suspension of cellulosic fibers.

2000 lb. of sulfite wood pulp is beaten at 0.6% consistency in water containing 60 parts per million of dissolved sulfate ions. The water is 80% recirculated white water recovered from the manufacture of rosin-sized paper. To this suspension is added 30 lb. (dry basis) of liquid gum rosin size and 50 lb. of papermaker's alum. After all the alum has dispersed, 52.5 lb. of powdered $BaCl_2$ is added. The suspension is discharged from the beater and 8.0 lb. of the sodium phosphate aluminate of my U. S. Patent No. 2,431,946 as a 5% aqueous solution is allowed to run in at the discharge end of the beater. The suspension is aged for 5 minutes by quiet flow through a large storage tank and is then sheeted on a Fourdrinier machine in the usual manner. The product is paper composed of rosin-sized cellulose fibers carrying alumina hydrate floc having barium sulfate particles adsorbed thereon. The paper carries about 3% of filler (barium sulfate, aluminum hydrate, and aluminum phosphate) corresponding to 80% retention of these materials.

The white water drained from the fibers during sheeting contains about 60 parts per million of dissolved sulfate ions and is suitable for reuse in the process described without addition of make-up water.

*Example 2*

The following illustrates the manufacture of rosin-sized, wet strength paper carrying about 3.7% by weight of barium sulfate and aluminum hydrate uniformly dispersed therethrough, while yielding a white water of low dissolved ion content.

2000 lb. of sulfate wood pulp is beaten in fresh water containing 100 parts per million of dissolved sulfate ions and diluted to 0.6% consistency with the same water. To the suspension during beating is added 30 lb. (dry basis) of liquid gum rosin size followed by 50 lb. of papermaker's alum, and, when the size has set, 96.0 lb. of powdered $BaCl_2$. The suspension is discharged from the beater and 8.0 lb. of sodium phosphate aluminate as a 5% aqueous solution is run into the flow. The stock, now containing 40 parts per million of dissolved sulfate ions, is pumped through a stock chest to provide an average retention period of 5 minutes and from there is pumped to a Fourdrinier machine. To the stock flowing through the headbox is added a dilute colloidal aqueous dispersion of the cationic melamine-formaldehyde resin of U. S. Patent No. 2,559,221, the preparation of which is more fully described in U. S. Patent No. 2,345,543, generally known as Parez 607 resin, at the rate of 2 lb. of the resin per 100 lb. of fiber, both calculated on the dry basis.

The paper formed is heated on rolls at 230° F. to dry the same and develop the strengthening properties of wet strength resin thereon. The dry paper obtained is well-sized paper of normal resistance to penetration by water and of normal wet strength. It contains 5.0% of filler (barium sulfate, aluminum hydrate, and aluminum phosphate) corresponding to 85% retention of both materials.

I claim:

1. A method for manufacturing sized paper of improved opacity and weight while discharging a white water having a dissolved sulfate ion content not materially greater than the dissolved sulfate ion content of the make-up water, which comprises forming a suspension of paper-making cellulosic fibers in make-up water having a dissolved sulfate ion content of less than about 800 parts per million, sizing said fibers in said suspension by addition of rosin size and alum thereto, adding barium chloride in amount at least about stoichiometrically equivalent to the sulfate content of said alum, whereby the dissolved sulfate ions introduced by said alum are precipitated as barium sulfate particles, adding from about ¼% to ½% of sodium aluminate based on the dry weight of the fibers, aging the suspension until a floc of aluminum hydrate forms which flocculates and adsorbs said barium sulfate particles, and the dissolved sulfate ion content of the water is decreased to a value not materially greater than the dissolved sulfate ion content of the make-up water, and sheeting and drying said fibers to form paper.

2. A process according to claim 1 wherein a sodium phosphate selected from the group consisting of the neutral and alkaline sodium phosphates is added with the sodium aluminate in amount equal to about 25% of the weight of the sodium aluminate.

3. A method for manufacturing sized, wet strength paper while decreasing the dissolved sulfate ion concentration of the water to a desirably low value for best adsorption of the wet strength resin, which comprises forming a suspension of paper-making cellulosic fibers in water having a dissolved sulfate ion content of about 10 to 150 parts per million, sizing said fibers in said suspension by addition of rosin size and alum thereto, adding barium chloride in amount at least about stoichiometrically equivalent to the sulfate content of said alum or in amount sufficient to decrease the dissolved sulfate ion content of the water to between about 30 and 150 parts per million, whichever is greater, whereby a precipitate of finely-divided barium sulfate particles forms, adding from about ¼% to ½% of sodium aluminate based on the dry weight of said fibers, aging said suspension until a floc of aluminum hydrate forms which flocculates and adsorbs said barium sulfate particles, then adding a cellulose-substantive wet strength resin in colloidal aqueous dispersion and adsorbing said resin on said fibers, sheeting said fibers to form paper, and heating said paper to dry the same and to develop the strengthening properties of the resin therein.

4. A process according to claim 3, wherein a sodium phosphate is added with the sodium aluminate in amount equal to about 25% of the weight thereof.

References Cited in the file of this patent

UNITED STATES PATENTS

| | | |
|---|---|---|
| 157,198 | Duemling | Nov. 24, 1874 |
| 1,806,474 | Lecocq | May 19, 1931 |
| 1,885,185 | Curtis | Nov. 1, 1932 |
| 2,315,892 | Booth | Apr. 6, 1943 |
| 2,548,513 | Boughton | Apr. 10, 1951 |
| 2,559,221 | Maxwell et al. | July 3, 1951 |
| 2,599,093 | Craig | June 3, 1952 |